(12) United States Patent
Haas et al.

(10) Patent No.: US 12,451,744 B2
(45) Date of Patent: Oct. 21, 2025

(54) STATOR WITH INTEGRATED COOLING FUNCTION, METHOD FOR PRODUCING A STATOR, AND ELECTRIC MACHINE

(71) Applicant: Vitesco Technologies Germany GMBH, Hannover (DE)

(72) Inventors: Astrid Haas, Falkensee (DE); Wilhelm Hackmann, Berlin (DE)

(73) Assignee: Vitesco Technologies Germany GmbH, Regensburg (DE)

( * ) Notice: Subject to any disclaimer, the term of this patent is extended or adjusted under 35 U.S.C. 154(b) by 265 days.

(21) Appl. No.: 18/299,873

(22) Filed: Apr. 13, 2023

(65) Prior Publication Data

US 2023/0253844 A1      Aug. 10, 2023

Related U.S. Application Data

(63) Continuation of application No. PCT/EP2021/078382, filed on Oct. 14, 2021.

(30) Foreign Application Priority Data

Oct. 14, 2020   (DE) .................... 10 2020 212 923.1

(51) Int. Cl.
  *H02K 3/24*    (2006.01)
  *H02K 1/20*    (2006.01)
  *H02K 9/197*   (2006.01)
(52) U.S. Cl.
  CPC ............... *H02K 3/24* (2013.01); *H02K 1/20* (2013.01); *H02K 9/197* (2013.01)
(58) Field of Classification Search
  CPC ....................................................... H02K 3/24
  (Continued)

(56) References Cited

U.S. PATENT DOCUMENTS

2011/0133580 A1*  6/2011  Sugimoto ............... H02K 1/20
                                                  310/54
2014/0300220 A1* 10/2014  Marvin .................... H02K 3/24
                                                  29/596

(Continued)

FOREIGN PATENT DOCUMENTS

DE    102014220148 A1    4/2016
DE    102017210778 A1   12/2018

(Continued)

OTHER PUBLICATIONS

International Search Report and Written Opinion dated Jan. 5, 2022 from corresponding International Patent Application No. PCT/EP2021/078382.

(Continued)

*Primary Examiner* — Oluseye Iwarere
*Assistant Examiner* — Minki Chang

(57) ABSTRACT

A stator for an electric machine of a motor vehicle, having an annular yoke, with an inner side directed inwards in the radial direction of the yoke, wherein a plurality of pole teeth are connected by form fit to the yoke on the inner side of the yoke, a stator winding which is formed as a mat and which is arranged between the pole teeth, a first cooling channel through which a cooling medium may flow and which extends in the longitudinal direction of the stator, wherein the first cooling channel is arranged in a recess, and a second cooling channel through which a cooling medium may flow, wherein the second cooling channel is arranged between two adjacent pole teeth between an inner side of the stator winding directed inwards in the radial direction of the stator and a pole shoe of the pole tooth.

10 Claims, 5 Drawing Sheets

(58) Field of Classification Search
USPC .................................................. 310/54, 58
See application file for complete search history.

(56) References Cited

U.S. PATENT DOCUMENTS

| | | | |
|---|---|---|---|
| 2017/0018991 A1 | 1/2017 | Blum | |
| 2019/0123612 A1* | 4/2019 | Weber | ................. H02K 1/20 |
| 2020/0185985 A1 | 6/2020 | Blum | |
| 2020/0185993 A1* | 6/2020 | Hoerz | ................. H02K 1/20 |
| 2020/0227965 A1 | 7/2020 | Richter | |
| 2021/0203197 A1* | 7/2021 | Saint-Michel | ......... H02K 1/148 |

FOREIGN PATENT DOCUMENTS

| | | |
|---|---|---|
| DE | 102017211317 A1 | 1/2019 |
| DE | 102017218933 A1 | 4/2019 |
| EP | 1404002 A1 | 3/2004 |
| EP | 3127223 B1 | 7/2018 |
| JP | 2005080474 A | 3/2005 |
| JP | 2020137384 A | 8/2020 |
| WO | 2019233739 A1 | 12/2019 |

OTHER PUBLICATIONS

German Office Action dated Jul. 13, 2021 for corresponding German Patent Application No. 10 2020 212 923.1.

* cited by examiner

STATOR WITH INTEGRATED COOLING FUNCTION, METHOD FOR PRODUCING A STATOR, AND ELECTRIC MACHINE

CROSS-REFERENCE TO RELATED APPLICATIONS

This application claims priority to PCT Application PCT/EP2021/078382, filed Oct. 14, 2021, which claims priority to German Patent Application No. DE 10 2020 212 923.1, filed Oct. 14, 2020. The disclosures of the above applications are incorporated herein by reference.

FIELD OF THE INVENTION

The invention concerns a stator for an electric machine, wherein the stator has a circular ring yoke with a plurality of pole teeth. A stator winding in the form of a mat is arranged between the pole teeth, wherein a cooling channel through which a cooling medium may flow is formed between the yoke and the stator winding and/or between the stator winding and a pole shoe of a pole tooth for cooling the stator. The invention also concerns a method for producing the stator according to the invention, and an electric machine with the stator according to the invention.

BACKGROUND OF THE INVENTION

A stator for an electric machine is known in principle. Likewise, different cooling concepts of stators are known in order to cool them during operation of the electric machine. In the known cooling concepts, it can be provided that end-face winding heads are cooled by ambient air drawn in and blown out in the radial direction of the stator. Often, cooling the winding heads alone is not sufficient to efficiently cool the electric machine or the stator. Therefore, it is further known that a cooling channel can be formed between a stator and a housing surrounding the stator in order to be able to cool an outer lateral surface of the stator, as described for example in EP 3 127 223 B1. External-side cooling of the stator can lead to increased installation space requirements.

SUMMARY OF THE INVENTION

It is an object of the invention to provide a stator for an electric machine which has efficient cooling and a reduced installation space.

This object is achieved by the subject described herein. Additional refinements of the invention are the subject of the following description and the drawings, wherein each feature may represent an aspect of the invention individually or in combination, unless the description explicitly specifies otherwise.

According to the invention, a stator is provided for an electric machine of a motor vehicle, having
  a circular ring yoke with an inner side directed inwards in the radial direction of the yoke, wherein a plurality of pole teeth are connected by form fit to the yoke on the inner side of the yoke, and the pole teeth are arranged at a distance from one another in the circumferential direction of the yoke,
  a stator winding formed as a mat and arranged between the pole teeth,
  a first cooling channel through which a cooling medium may flow and which extends in the longitudinal direction of the stator, wherein the first cooling channel is arranged in a recess which, starting from the inner side of the yoke, extends outwards between two adjacent pole teeth in the radial direction of the yoke, the first cooling channel rests at least in portions directly against a wall defining the recess and/or in portions directly against the stator winding, and/or
  a second cooling channel through which a cooling medium may flow, wherein the second cooling channel is arranged between two adjacent pole teeth between an inner side of the stator winding directed inwards in the radial direction of the stator and a pole shoe of the pole tooth, and the second cooling channel rests at least in portions directly against the stator winding and/or against the pole shoe.

In other words, one aspect of the present invention is that a stator is provided for an electric machine of a motor vehicle. The electric machine is used in the drive train of the motor vehicle. Thus, the electric machine may be a traction drive. The motor vehicle may be a partially or fully electrically driven motor vehicle.

The stator has an annular yoke. Normally, the yoke is formed by a plurality of annular punched laminations which are arranged successively in the axial direction of the stator and connected together. The connection is an adhesive connection and/or a welded joint and/or a stamped connection.

The yoke has an inner side on a side directed inwards in the radial direction of the stator or the yoke. A plurality of pole teeth are arranged at least by form fit on the inner side, wherein the pole teeth are spaced from one another in the circumferential direction of the yoke. Connected together at least partially by form fit means that, in addition to the form-fit connection between the pole tooth and the yoke, for example a substance-bonded connection may also be provided in order to improve the stiffness of the connection of the pole teeth to the yoke. The mutual spacing of the pole teeth, such as a pole shaft of the pole teeth, in the circumferential direction of the yoke is even and/or regular.

The pole teeth may each be formed as an individual tooth. It is also conceivable that the pole teeth are connected to each other by a narrow bar on an outer side facing away from the yoke. In other words, each pole tooth has a pole shoe on a side facing away from the yoke, wherein the pole shoes of two adjacent pole teeth may be connected to each other.

A stator winding is arranged between the pole teeth and extends in the longitudinal direction of the stator and is formed into a winding head at the end face and/or end side of the stator. The stator winding is formed as a mat. Such a stator winding may also be referred to as an endless winding and/or shaped wire winding. The mat is characterized in that the three conductors U, V, W are formed into a shaped wire structure in one plane before being placed on the pole teeth and then inserted between the pole teeth. The electrical conductors of the mat are made of copper or at least partially include copper. The electrical conductors have a substantially rectangular cross-section, relative to their longitudinal direction. In addition, the conductors may have an insulating coating so that the layers of the stator winding are galvanically separated from each other.

Starting from the inner side of the yoke, a recess extending outwards in the radial direction of the yoke is formed between two pole teeth arranged side by side. The recess may also be referred to as a groove extending in the longitudinal direction of the yoke between the pole teeth, wherein the groove opening is directed inwards in the radial direction of the yoke. A first cooling channel through which a cooling medium may flow is arranged and/or formed in the recess and extends in the longitudinal direction of the stator. The first cooling channel rests at least in portions directly against a wall defining the recess and/or in portions directly against the stator winding. The expression "rests directly against" means that a wall material forming the first cooling channel is in direct contact with the yoke and/or with an insulating sheath of an electrical conductor of the stator winding. Consequently, the first cooling channel is located in the recess, providing cooling integrated into the stator. Due to the direct, i.e. immediate, contact of the first cooling channel with the yoke or stator winding, the stator is cooled directly at the stator winding, thus increasing the cooling of the stator and improving the performance of the electric machine.

Alternatively and/or in addition to the first cooling channel, a second cooling channel through which the cooling medium may flow is formed between an inner side of the stator winding directed inwards in the radial direction of the stator and a pole shoe of the pole tooth. The second cooling channel rests at least in portions directly against the stator winding and/or against the pole shoe. The term "directly" means that a wall material forming the second cooling channel is in direct contact with an electrical conductor of the stator winding or with the pole tooth. The second cooling channel is thus located between the pole teeth in direct proximity to the inner side of the stator. Due to the direct, i.e. immediate, contact of the first cooling channel with the stator winding or pole shoe, the stator is cooled directly at the stator winding close to a rotor, thus increasing the cooling of the stator and improving the performance of the electric machine.

The cooling integrated in the stator as a result of the first cooling channel and/or the second cooling channel also reduces the installation space of the stator and/or the electric machine.

The cooling medium is in an embodiment a cooling liquid. The cooling liquid may be an oil or water.

In an embodiment of the invention, the first cooling channel is guided as far as the inner side of the yoke. Therefore, the stator winding is guided to the inner side in a space between the pole teeth, relative to the radial direction of the yoke, and the first cooling channel rests at least in portions directly against the stator winding. In this way, the space is filled to the maximum with the stator winding, thus achieving a high efficiency of the electric machine. By placing the cooling channel in the recess of the yoke with direct contact with the stator winding, efficient cooling is achieved.

In a refinement of the invention, it is provided that the first cooling channel is guided starting from the recess into a space between the pole teeth. In this way, the stator is cooled not only in line with the yoke, relative to its circumferential direction, but also in line with the pole teeth, relative to the circumferential direction of the stator. Thus, effective cooling is achieved in the region of the stator winding.

In principle, it may be provided that the stator winding is formed as a single layer relative to the radial direction of the stator, wherein a side of the single-layer stator winding directed outwards in the radial direction of the stator rests at least in portions against the first cooling channel and/or a side directed inwards in the radial direction of the stator rests against the second cooling channel.

A refinement of the invention lies in that the stator winding is formed in multiple layers relative to the radial direction of the stator, and is formed in a single layer between two pole teeth relative to the circumferential direction of the stator. The single-layer arrangement of the stator winding between two pole teeth relative to the circumferential direction of the stator allows the stator winding to be inserted in a simple manner. If the space between two pole teeth in the circumferential direction of the stator is insignificantly wider than the width of the stator winding, the latter may also be arranged between the pole teeth in a simple, reliably positioned manner. Via the multiple layers of the stator winding in the radial direction, the filling degree of the stator winding between the pole teeth is increased accordingly, which increases the efficiency of the electric machine.

In an embodiment of the invention, it is provided that the first cooling channel and/or the second cooling channel is connected to a first annular channel at the end face and/or end side of the stator and/or the second cooling channel is connected to a second annular channel at the end face and/or end side. Accordingly, the stator has an end face or end side at its axial end. The first cooling channel is connected to the first annular channel in a fluid-tight and/or media-tight manner so that the cooling medium may transfer and/or flow from the first cooling channel into the first annular channel. Likewise, the second cooling channel opens out into a second annular channel. On the one hand, the first annular channel may be an arc segment that, at the end face on the stator, connects together two first cooling channels arranged spaced apart from each other. However, the first annular channel may also be circular ring-shaped in order to connect a plurality of first cooling channels to each other fluidically. The first annular channel may have an outlet and/or an inlet. The cold cooling medium is supplied via the inlet. The heated cooling medium is discharged via the outlet. The first annular channel formed as a circular ring may surround the winding head of the stator winding, formed at the end face on the stator, on its outer circumferential side and/or on its inner circumferential side, relative to the radial direction of the stator. The explanations regarding the design of the first annular channel for connection to the first cooling channel apply accordingly to the second annular channel for fluidic connection to the second cooling channel. It is also conceivable that the first annular channel of the first cooling channel is fluidically connected to the second annular channel of the second cooling channel.

In principle, the first cooling channel and/or the second cooling channel are formed in such a way that they may conduct a cooling medium, are temperature-resistant, and have increased resistance to corrosive media.

A refinement of the invention lies in that the first cooling channel and/or the second cooling channel are formed from a plastics material. The plastics material may be a thermoset. Plastics exhibit increased resistance to aggressive and corrosive media. Thermosets have an increased temperature resistance. In addition, plastics are very lightweight, so a cooling channel is provided that is temperature-resistant, has a reduced weight, and is suitable for aggressive ambient media.

In a refinement of the invention, it is provided that the pole shoes of second adjacent pole teeth are formed without gaps. In other words, there is no gap formed between the individual pole pieces through which the stator winding could be inserted into the space. The gap-free design of the pole shoes, relative to the circumferential direction of the stator, is beneficial for the torque of the electric machine.

The pole teeth are connected by form fit to the inner side of the yoke. This form fit may be provided in many different ways. A refinement of the invention provides that the pole teeth are connected to the yoke via a dovetail connection. In other words, a pole tooth usually has a pole shaft, wherein the pole shoe is formed adjacently to the pole shaft in the radial direction of the stator. A width of the pole shoe relative to the circumferential direction of the stator is greater than a width of the pole shaft relative to the circumferential direction of the stator. In other words, the pole tooth is formed as a hammerhead shape. On a side facing away from the pole shoe, the pole tooth has a dovetail-shaped protrusion which engages in a recess corresponding to the dovetail-shaped protrusion on the inner side of the yoke. Such a dovetail-shaped form fit provides a secure and rigid connection between the pole tooth and yoke, which may have a positive effect on the noise development of the electric machine, such as the noise, vibration and harshness behavior (NVH).

It is conceivable that a depth of the recess in the radial direction corresponds approximately to a width of the recess in the circumferential direction of the yoke near the inner side. The term "approximately" means that, relative to the width of the recess in the circumferential direction of the yoke on the inner side, the depth is either a maximum of 30% greater or a maximum of 30% less than the width of the recess. This includes the limits.

In an embodiment of the invention, it is provided that the recess, relative to the cross-section of the yoke, is designed to widen outwards in a radial direction starting from the inner side. In other words, the cross-section of the recess and/or the groove increases over its depth, starting from the inner side, in the radial direction of the yoke. In this way, the first cooling channel is form fitted in the recess, which allows the cooling channel to be fixed in a reliably positioned manner in the recess.

An inner diameter of the cooling channel may be round. However, it is also conceivable that the inner diameter has an oval and/or angular, for example square, design.

It is provided that the yoke has a yoke outer side on an outer side directed outwards in the radial direction, and the stator is arranged in a housing, wherein a third cooling channel is formed between the yoke outer side and the housing. In this way, the cooling capacity of the electric machine is increased, since in addition to the integrated stator cooling via the first cooling channel and/or the second cooling channel, the third cooling channel is also provided to cool the electric machine.

The third cooling channel runs in the longitudinal direction of the stator. The third cooling channel may have a plurality of third cooling channels arranged parallel to each other, which open out into a third annular channel at the end face of the stator. The third cooling channel is fluidically connected to the first cooling channel and/or the second cooling channel. For example, the third annular channel is fluidically coupled to the first annular channel and/or the second annular channel.

The invention also relates to a method for producing the stator according to the invention, wherein the first cooling channel and/or the second cooling channel are formed by an overmolding process and/or a transfer molding process. In this way, the first cooling channel and/or the second cooling channel is formed in a simple and inexpensive manner, such as from plastic.

In a refinement of the invention, it is provided that the first cooling channel and/or the second cooling channel is formed on the yoke after the pole teeth including the stator winding have been arranged by a form fit. In other words, the stator winding is first placed in the space between the pole teeth. Subsequently, the pole teeth are connected by form fit to the yoke and the winding head is formed. In a further step, the first cooling channel and/or second cooling channel are formed. For this purpose, it may be provided that a lance is guided into the recess in the longitudinal direction of the stator to form the first cooling channel, and the annular space between the lance, the wall of the recess and the stator winding is cast. In this way, the integrated first cooling channel is produced inexpensively. In addition, an optimum thermal connection of the first cooling channel to the yoke and the stator winding is achieved. To form the second cooling channel, a lance is inserted between the inner side of the winding and the pole shoes, and the annular space is then filled, thus achieving an optimum thermal connection of the second cooling channel to the stator winding and the pole tooth. In addition, the stator winding may be fixed in a reliably positioned manner in the space between the pole teeth via potting.

The invention moreover relates to an electric machine having the stator according to the invention. The electric machine is a traction drive in an at least partially electrically driven motor vehicle.

The design of the stator is also used on the electric machine according to the invention and/or in the method according to the invention. This also applies conversely.

Further features and advantages of the present invention will emerge from the following exemplary embodiments.

The exemplary embodiments are to be understood not as restrictive, but rather as examples. They are intended to enable a person skilled in the art to carry out the invention. The applicant reserves the right to make one and/or more of the features disclosed in the exemplary embodiments.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The exemplary embodiments will be discussed in more detail with reference to drawings, In the drawings.

DETAILED DESCRIPTION OF THE PREFERRED EMBODIMENT

The following description of the preferred embodiment(s) is merely exemplary in nature and is in no way intended to limit the invention, its application, or uses.

Figure 1:
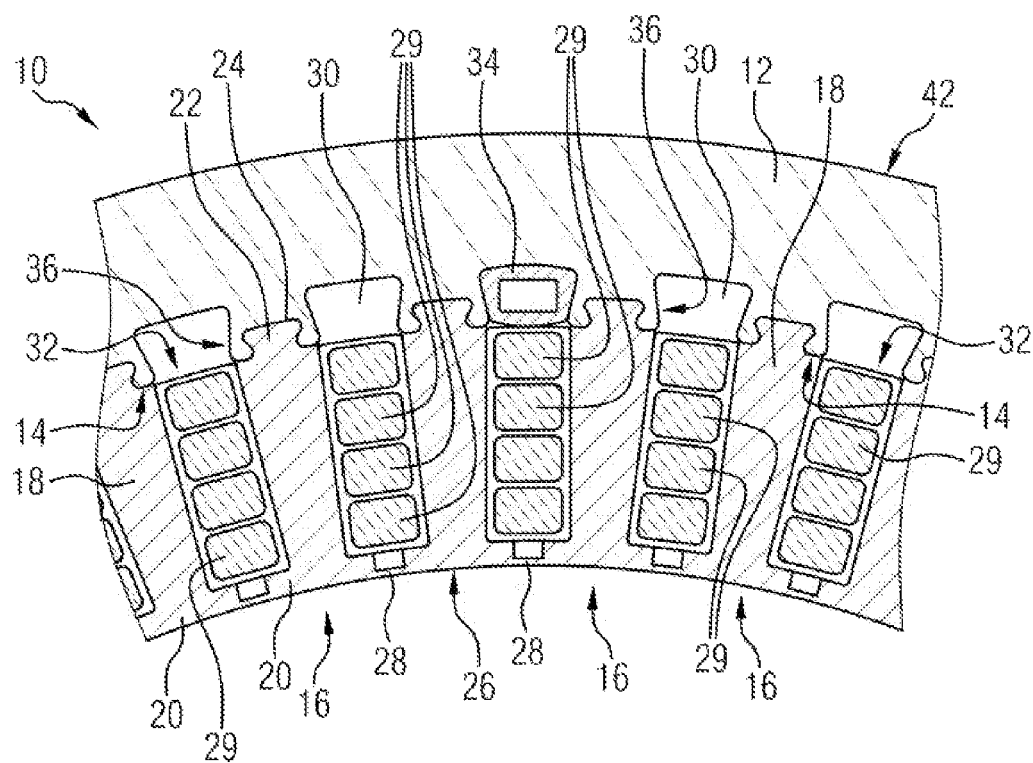
FIG. 1 shows a detail of a stator in cross-section with first cooling channels.

In FIG. 1, a detail or detailed view of a stator 10 is shown in a cross-section of the stator 10. The stator 10 has an annular yoke 12. The yoke 12 is also referred to as a yoke ring. Normally, the yoke 12 is formed by a plurality of annular punched laminations which are arranged successively in the axial direction of the stator 10 and connected together. The laminations are in an embodiment soft magnetic electrical sheets. The connection may for example be a welded connection or an adhesive connection. The yoke 12 has an inner side 14 on a side directed inwards in the radial direction of the yoke 12. A plurality of pole teeth 16 are arranged on the inner side 14, at least by form fit. Connected together at least partially by form fit means that, in addition to the form fit connection, for example a substance-bonded connection may also be provided between the pole teeth 16 and the yoke 12 in order to improve the stiffness of the connection of the pole teeth 16 to the yoke 12.

Each pole tooth 16 generally has a pole shaft 18 and a pole shoe 20 adjoining the pole shaft 18 in the radial direction of the stator 10. A width of the pole shoe 20 relative to the circumferential direction of the stator 10 is greater than a width of the pole shaft 18 relative to the circumferential direction of the stator 10. In other words, the pole tooth 16 is formed as a hammerhead shape. On a side facing away from the pole shoe 20, the pole tooth 16 has a dovetail-shaped protrusion 22 which engages in a recess 24 corresponding to the dovetail-shaped protrusion 22 on the inner side 14 of the yoke 12. Such a form fit forms a secure connection between pole tooth 16 and yoke 12.

The pole teeth 16 are spaced apart from each other in the circumferential direction of the yoke 12. It is conceivable that the pole teeth 16 are formed as single teeth. However, it may also be provided that the pole teeth 16 are connected to each other in the circumferential direction of the stator 10 via a narrow bar 28 on an outer side 26 facing away from the yoke 12. In other words, the pole shoes 20 of two pole teeth 16 arranged side by side are formed without gaps between them in the circumferential direction of the stator 10.

The spacing of the pole teeth 16, and of the pole shafts 18, from one another in the circumferential direction of the yoke 12 is an even or regular spacing. Between the pole teeth 16 or the pole shafts 18, there is arranged a stator winding 29 formed as a mat which extends in the longitudinal direction of the stator 10 and is formed into a winding head (not shown) at the end face on the stator 10.

Starting from the inner side 14 of the yoke 12, a recess 30 extending outwards in the radial direction of the yoke 12 is formed between two pole teeth 16 arranged side by side. The recess 30 may also be referred to as a groove extending in the longitudinal direction of the yoke 12 between the pole teeth 16, wherein the groove opening 32 of the recess 30 is directed inwards in the radial direction of the yoke 12. A first cooling channel 34 through which a cooling medium may flow is arranged in the recess 30 and extends in the longitudinal direction of the stator 10. The cooling medium is, in an embodiment, a cooling liquid. The cooling liquid may be an oil or water. The first cooling channel 34 is arranged in the recess 30, providing a cooling that is integrated in the stator 10.

The first cooling channel 34 rests on the one hand against a wall 36 defining the recess 30 and on the other hand at least in portions against the stator winding 29 directly. Due to the direct, i.e., immediate contact of the first cooling channel 34 against a partial region of the stator winding 29 and against the wall 36 of the recess 30, the stator 10 is cooled efficiently, which at the same time increases the performance of the electric machine 40. The cooling integrated in the stator 10 also reduces the installation space of the stator 10 and/or the electric machine 40.

A depth of the recess 30 in the radial direction of the yoke 12 corresponds approximately to a width of the recess 30 in the circumferential direction of the yoke 12 near or on the inner side 14. The term "approximately" means that, relative to the width of the recess 30 in the circumferential direction of the yoke 12 on the inner side 14, the depth is either a maximum of 30% greater or a maximum of 30% less than the width of the recess 30. The limits are included here.

In relation to the cross-section of the yoke 12, the recess 30 is designed to widen outwards in a radial direction starting from the inner side 14. In other words, the cross-section of the recess 30 and/or the groove increases, starting from the inner side 14, in the radial direction of the yoke 12. In this way, the first cooling channel 34 is positioned in the recess 30 in a reliably positioned manner.

The stator winding 29 is formed in multiple layers relative to the radial direction of the stator 10, wherein the radially outer layer of the stator winding 29 rests at least in portions against the first cooling channel 34. Relative to the circumferential direction of the stator, the stator winding 29 is formed in a single layer between two pole teeth 16. The stator winding 29, which is arranged adjacently in the radial direction, is formed by the mat or shaped wire winding, wherein the electrical conductor of the shaped wire winding is formed from copper and/or includes copper at least in part. The electrical conductor has a substantially rectangular cross-section, relative to its longitudinal direction. The stator winding 29 is arranged adjacently in the radial direction within the space delimited by the pole teeth 16, wherein the adjacently arranged electrical conductors are arranged galvanically isolated from one another and/or have an insulating coating.

Figure 2:
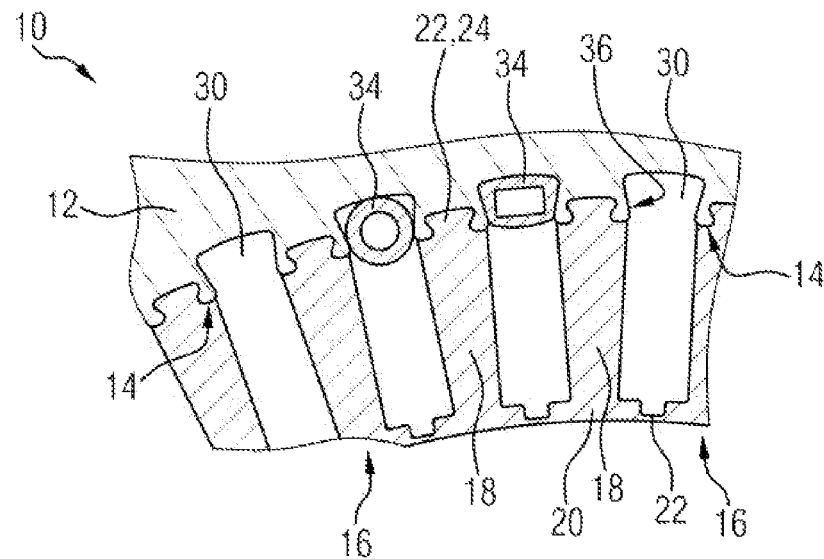
FIG. 2 shows a detail of the stator in cross-section without stator winding first cooling channels.

FIG. 2 shows a further detail or detailed view of the stator 10 known from FIG. 1, wherein the stator winding 29 is not shown. The first cooling channel 34 may be arranged in the recess 30 in various ways. It is conceivable that the first cooling channel 34 is formed as a hose. It may be provided that, before the pole teeth 16 are connected to the yoke 12, the first cooling channel 34 is inserted and/or clamped into the recess 30. It is conceivable here that the first cooling channel 34 also protrudes at least in portions over the inner side 14 in the direction of the pole teeth 16. It is also possible that the first cooling channel 34 terminates flush with the inner side 14. Furthermore, it may be provided that an inner diameter of the first cooling channel 34 may have, for example, a round or an angular cross-section. Although not shown, it is provided that a first cooling channel 34 is arranged in each recess 30 between the pole teeth 16. This also applies to FIG. 1, where only a first cooling channel 34 is shown.

Figure 3:
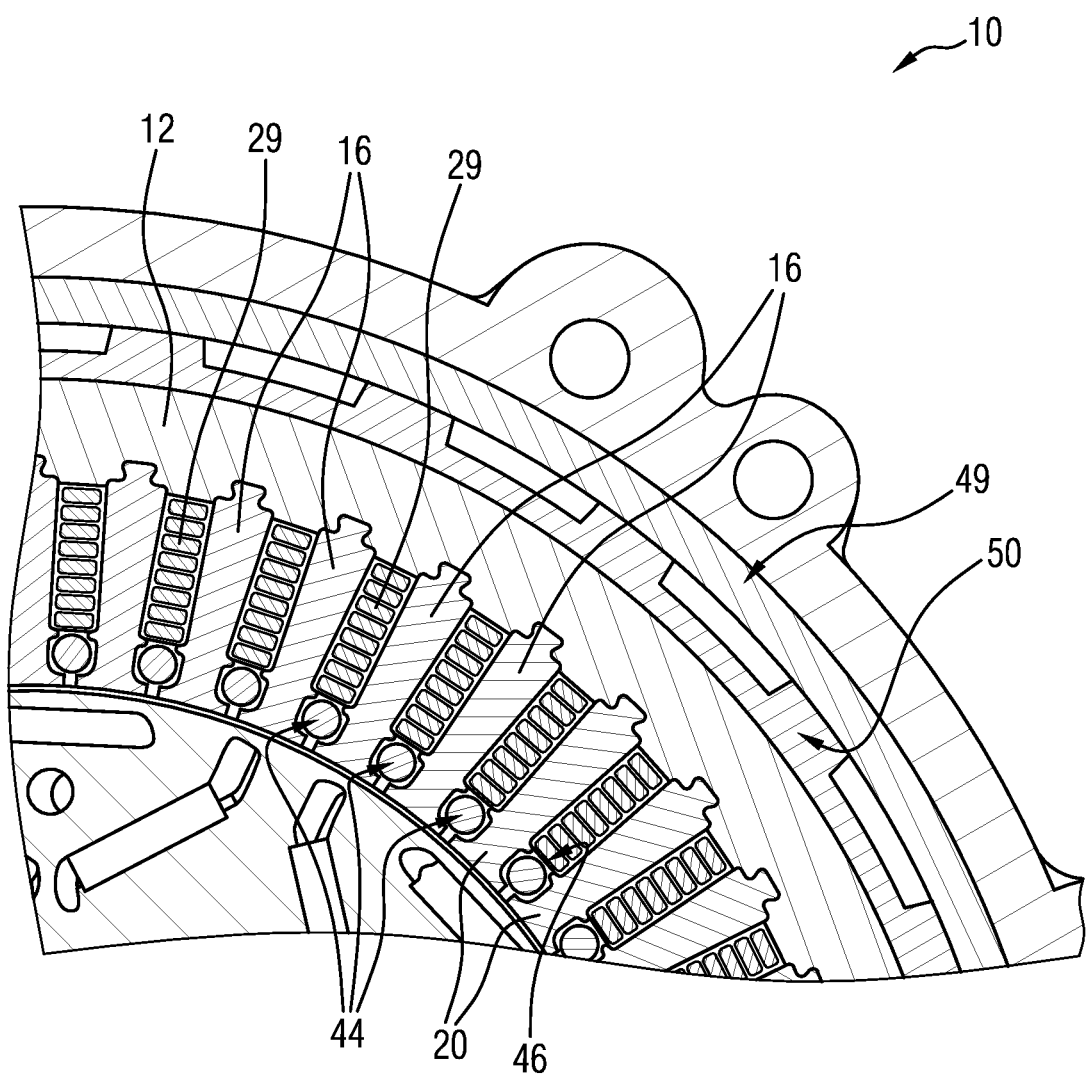
FIG. 3 shows a detail of the stator in cross-section with second cooling channels and third cooling channels.

In FIG. 3, a detail of the stator 10 is shown, wherein the stator 10 now has a second cooling channel 44, in contrast to the stator 10 shown in FIGS. 1 and 2. The second cooling channel 44 is arranged between two adjacent pole teeth 16 between an inner side 46 of the stator winding 29 directed inwards in the radial direction of the stator 10 and a pole shoe 20 of the pole tooth 16. In this case, it is provided that the second cooling channel 44 rests at least in portions directly against the inner side 46 of the stator winding 29 and against the pole shoe 20. The term "directly" means that a wall forms the second cooling channel 44. However, this may be designed, it is at least in portions in direct contact in the pole shoe 20 and/or with an electrical conductor of the stator winding 29, and in an embodiment with the insulating sheath of the electrical conductor of the inner side 46 of the stator winding 29. The direct contact of the second cooling channel 44 with the stator winding 29 and the pole tooth 16 increases the cooling effect.

Figure 4:
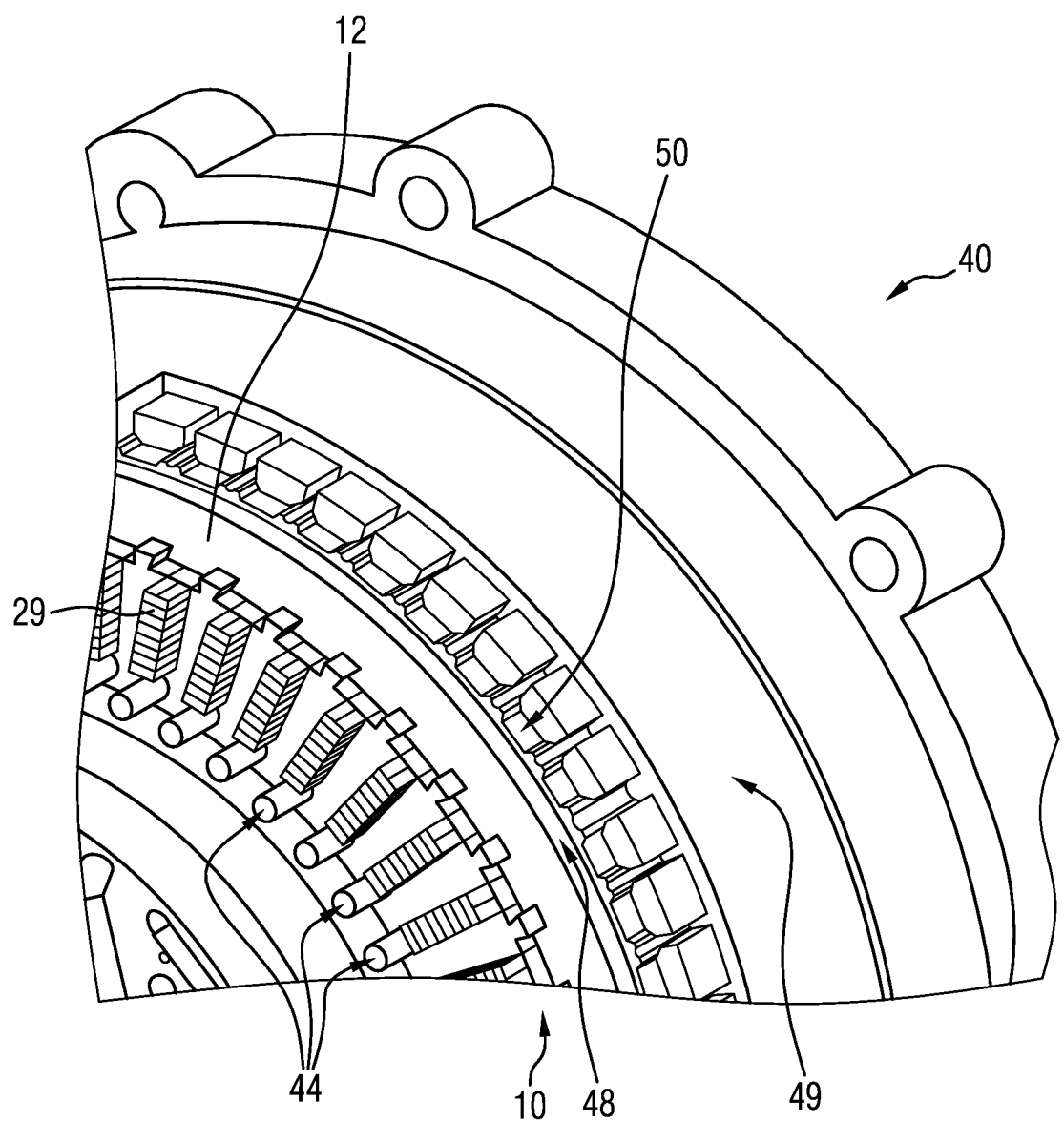
FIG. 4 shows a three-dimensional view of a detail of the stator with the second and the third cooling channels.

In FIG. 4, a three-dimensional view of the stator 10 for the electric machine 40 known from FIG. 3 is shown. The stator 10 is arranged in a housing 49 of the electric machine 40. A third cooling channel 50 is arranged and/or formed between an outer yoke side 48 directed outwards in the radial direction of the stator 10 and the housing 49. The third cooling channel 50 is substantially U-shaped, wherein the ends of the upright legs of the U-shaped third cooling channel 50 seal against the housing 49 and thus form the third cooling channel 50. By directly connecting the third cooling channel 50 to the yoke 12 and to the housing 49, an increased cooling effect may also be achieved.

Figure 5:
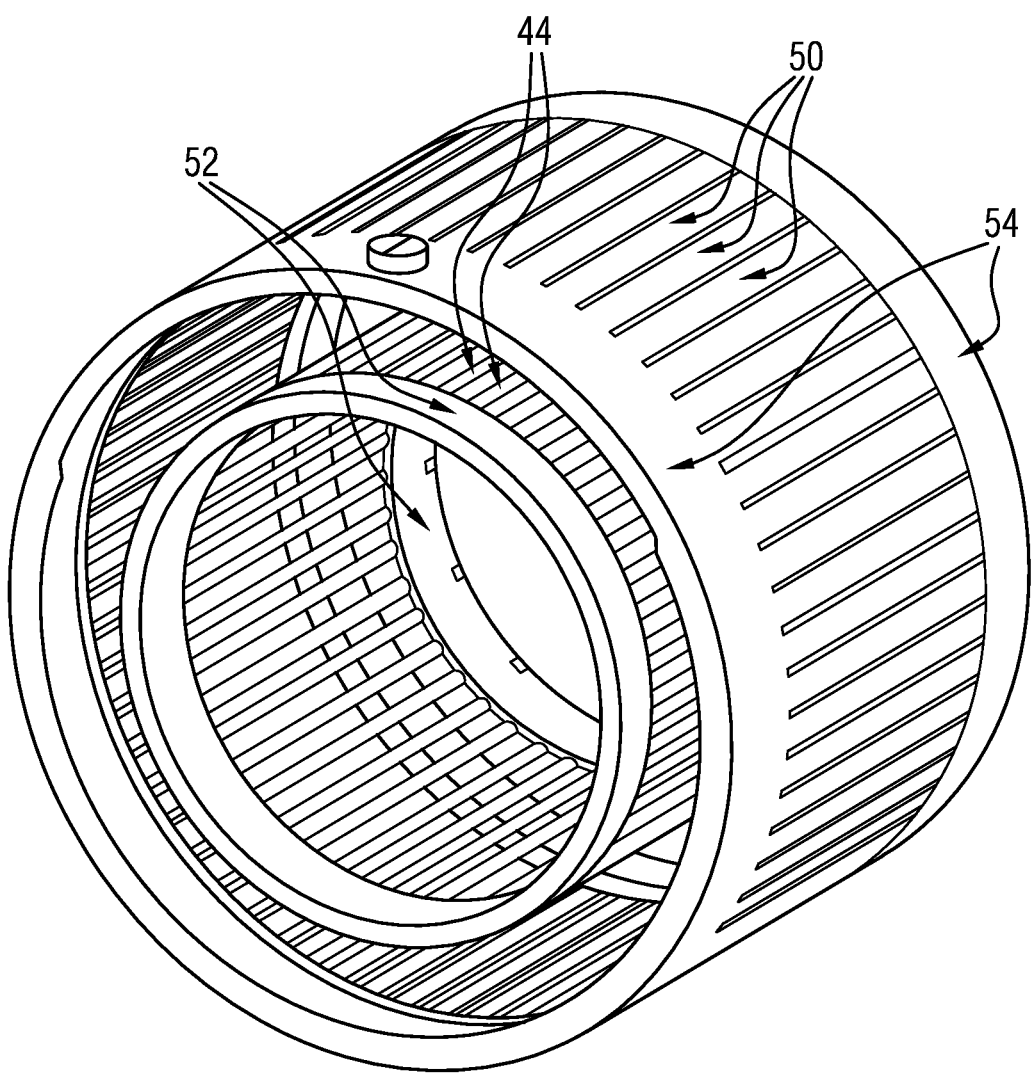
FIG. 5 shows a three-dimensional view of the second and third cooling channels with the corresponding annular channels.

FIG. 5 shows a three-dimensional view of the second cooling channel 44 and the third cooling channel 50. The second cooling channel 44 terminates at each distal end in a second annular channel 52. The third cooling channel 50 opens out at its distal end into a third annular channel 54. In this way, the cooling medium is distributed accordingly over the respective annular channel 52, 54. Although not shown, it may thus be provided that the second annular channel 52 and the third annular channel 54 are fluidly interconnected.

Figure 6:
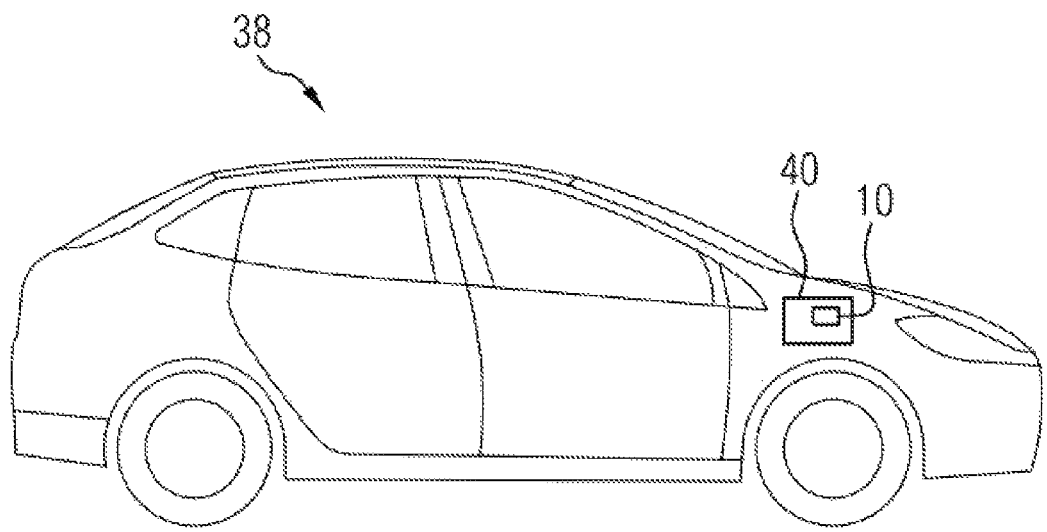
FIG. 6 shows a schematic view of a motor vehicle with an electric machine having the stator.

FIG. 6 shows a motor vehicle 38. The motor vehicle 38 is an at least partially electrically driven motor vehicle. In the drive train of the motor vehicle 38 there is arranged an electric machine 40 in which the stator 10 is arranged.

Figure 7:
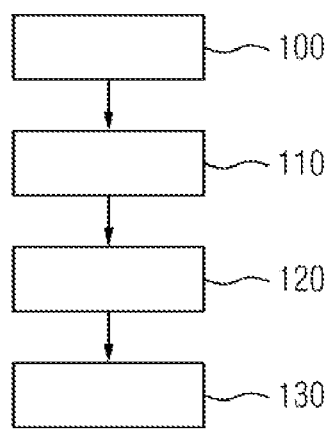
FIG. 7 shows a method for producing the stator.

FIG. 7 shows a method for producing a stator 10. In a first step 100, an annular yoke 12 is provided having alternating recesses 30 on the inner side 14 for receiving the first cooling channel 34 and receptacles 24 corresponding to the dovetail-shaped protrusions 22 of the pole teeth 16.

In a second step 110, the pole teeth 16 are provided, wherein an endless stator winding 29 is arranged in multiple layers between the mutually spaced pole teeth 16, starting from a side facing away from the pole shoe 20.

In a third step 120, the pole teeth 16 including the stator winding 29 are connected by form fit to the yoke 12, so that the dovetail-shaped protrusions 22 of the pole shoes 16 engage in the accordingly corresponding receptacles 24 of the yoke 12. In addition, the winding head is formed.

In a fourth step, the first cooling channel 34 and/or second cooling channel 44 are formed.

To form the first cooling channel 34, a first cooling channel 34 is formed in the recess 30 or is formed in each of the plurality of recesses 30 by an overmolding and/or transfer molding process. For this purpose, for example, a lance is guided into the recess 30 in the longitudinal direction of the stator 10. The annular space between the lance, the wall 36 of the recess 30 and the stator winding 29 is then cast. In this way, the integrated first cooling channel 34 is produced inexpensively and may have an optimal thermal connection to the yoke 12 and the stator winding 29. In addition, the stator winding 29 may be arranged in a reliably positioned manner in the space between the pole teeth 16 via potting. Conceivably, the transfer molding process may also use a plastics material to encapsulate and/or overmold the winding head and an outer lateral surface 42 of the yoke 12 that is arranged spaced apart from the inner side 14.

To form the second cooling channel 44, a lance is inserted into the space between the inner side 46 of the winding and the pole shoes 20 of two adjacent pole teeth 16, and the annular space between the lance and the stator winding 29 and between the lance and the pole shoes 20 is cast and/or filled with a plastics material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stator for an electric machine of a motor vehicle, the stator comprising:
   an annular yoke, with an inner side directed inwards in the radial direction of the annular yoke;
   a plurality of pole teeth are connected by form fit to the annular yoke on the inner side of the annular yoke, and the plurality of pole teeth are spaced apart from each other in the circumferential direction of the annular yoke;
   a stator winding which is formed as a mat and which is arranged between each of the plurality of pole teeth;
   a first cooling channel through which a cooling medium may flow and which extends in the longitudinal direction of the stator; and
   a recess which, starting from the inner side of the annular yoke, extends outwards between two adjacent pole teeth in the radial direction of the annular yoke, and the first cooling channel is arranged in the recess such that the first cooling channel rests at least in portions directly against a wall defining the recess and/or in portions directly against the stator winding;
   wherein the first cooling channel is guided starting from the recess into a space between the pole teeth.

2. The stator of claim 1, wherein the first cooling channel is guided as far as the inner side of the annular yoke.

3. The stator of claim 1, wherein the stator winding is formed in multiple layers relative to the radial direction of the stator, and is formed in a single layer between two pole teeth relative to the circumferential direction of the stator.

4. The stator of claim 1, wherein the first cooling channel is connected at the end side of the stator to a first annular channel.

5. The stator of claim 1, wherein the first cooling channel is formed from a plastics material.

6. The stator of claim 1, wherein each of the plurality of pole teeth are connected to the annular yoke via a dovetail connection.

7. The stator of claim 1, wherein the recess, relative to the cross-section of the annular yoke, is designed to widen outwards in a radial direction starting from the inner side.

8. A method for producing a stator, comprising the steps of:
   providing an annular yoke, with an inner side directed inwards in the radial direction of the annular yoke;
   providing a plurality of pole teeth are connected by form fit to the annular yoke on the inner side of the annular yoke, and the plurality of pole teeth are spaced apart from each other in the circumferential direction of the annular yoke;
   providing a stator winding which is formed as a mat and which is arranged between each of the plurality of pole teeth;
   providing a first cooling channel through which a cooling medium may flow and which extends in the longitudinal direction of the stator; and
   providing a recess which, starting from the inner side of the annular yoke, extends outwards between two adjacent pole teeth in the radial direction of the annular yoke;
   arranging the first cooling channel in the recess such that the first cooling channel rests at least in portions directly against a wall defining the recess and/or in portions directly against the stator winding, and the first cooling channel is guided starting from the recess into a space between the pole teeth;

forming the first cooling channel by an overmolding process and/or a transfer molding process.

9. The method of claim 8, further comprising the step of forming the first cooling channel on the annular yoke after the pole teeth comprising the stator winding have been arranged by a form fit.

10. An electric machine, comprising:
a stator, the stator further comprising:
- an annular yoke, with an inner side directed inwards in the radial direction of the annular yoke;
- a plurality of pole teeth are connected by form fit to the annular yoke on the inner side of the annular yoke, and the plurality of pole teeth are spaced apart from each other in the circumferential direction of the annular yoke;
- a stator winding which is formed as a mat and which is arranged between each of the plurality of pole teeth;
- a first cooling channel through which a cooling medium may flow and which extends in the longitudinal direction of the stator; and
- a recess which, starting from the inner side of the annular yoke, extends outwards between two adjacent pole teeth in the radial direction of the annular yoke, and the first cooling channel is arranged in the recess such that the first cooling channel rests at least in portions directly against a wall defining the recess and/or in portions directly against the stator winding;
- wherein the first cooling channel is guided starting from the recess into a space between the pole teeth.

* * * * *